July 31, 1962   G. U. SORGER ET AL   3,047,803
RADIO-FREQUENCY POWER BRIDGE
Filed June 30, 1959   3 Sheets-Sheet 1
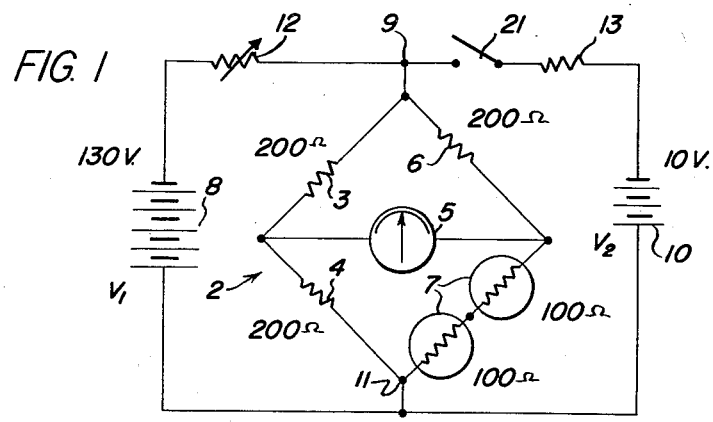
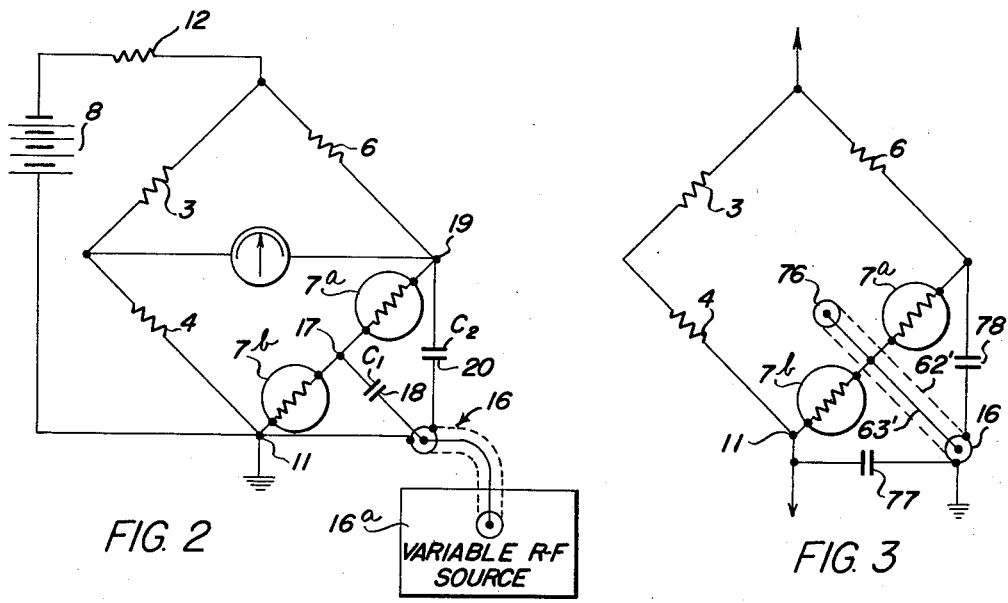
INVENTORS.
GUNTHER U. SORGER
SAMUEL J. RAFF
BY
ATTORNEY

INVENTOR.
GUNTHER U. SORGER
SAMUEL J. RAFF

BY Max L. Libman

ATTORNEY

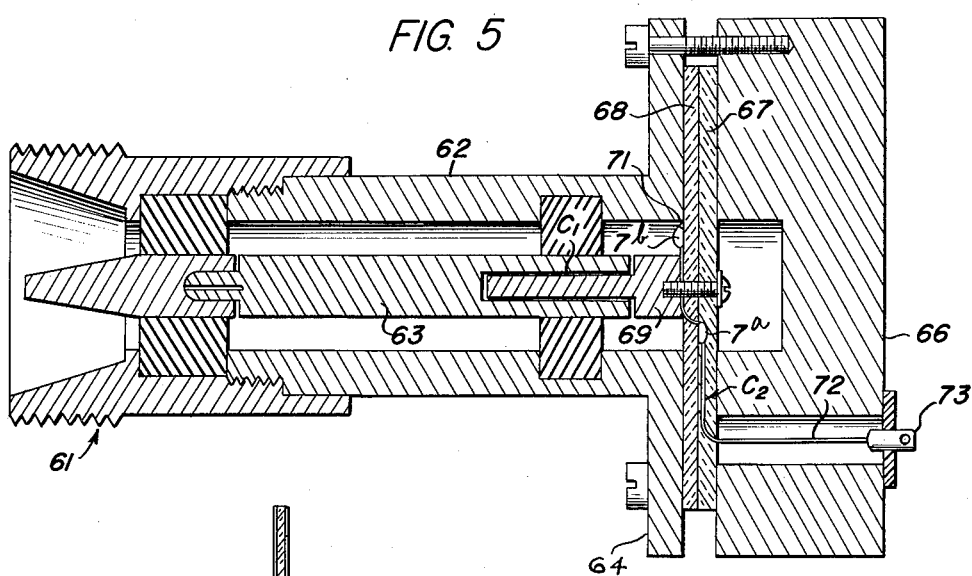

United States Patent Office 3,047,803
Patented July 31, 1962

3,047,803
RADIO-FREQUENCY POWER BRIDGE
Gunther U. Sorger, Rockville, and Samuel J. Raff, Chevy Chase, Md., assignors, by mesne assignments, to Weinschel Engineering Co., Inc., Kensington, Md., a corporation of Delaware
Filed June 30, 1959, Ser. No. 823,970
4 Claims. (Cl. 324—106)

This invention relates to devices for measuring high and ultrahigh frequency power, and more particularly to a bridge circuit capable of serving as a reference for measuring a predetermined value of high frequency power with precision.

The calibration of microwave equipment such as signal generators, receivers, antennas, etc., is usually accomplished by power measuring devices, since in the frequency range from 100 mc. to 10,000 mc. power can more readily be measured with reasonable accuracy than voltage or current.

Microwave power meters of the bolometric type are known in which a thin wire (barretter), or a bead of semiconducting material, e.g., a thermistor, absorbs the microwave power. This results in a temperature increase which is a function of the power absorbed, and the temperature dependent resistance change of the heated element is used indirectly to measure the absorbed power; threfore, the temperature coefficient of the resistive material is involved in the resulting microwave indication, and must be taken into consideration. In order to eliminate this factor, a null method is commonly used, wherein a certain amount of D.-C. or audio frequency bias power (hereafter referred to as low frequency power) is introduced into the microwave absorbing resistor element, which is larger than any microwave power to be measured. The resistor element is then placed in a Wheatstone type bridge circuit, and a balance is obtained, with no microwave power present, varying the low frequency bias power. Then the microwave power is fed into the absorbing resistor element, resulting in a bridge unbalance, due to the temperature-dependent change in resistance of the element because of the added R.-F. power. By decreasing the low frequency bias power, the bridge is brought back to balance, which means, the resistance of the absorbing element is the same as it was before the microwave power was fed into it. It is assumed that the change in average resistance for an equal amount of low frequency power and microwave power is the same; hence the amount of low frequency bias power which was withdrawn to obtain re-balance must be the amount of microwave power which the resistance element absorbed; thus the value of the change in low frequency power for the two conditions of balance is a measure of the R.-F. power.

The invention will be discussed in connection with a thermistor as the absorbing resistance element, but it will be understood that the following discussion is also applicable to a barretter type of resistor element or to any other type of bolometric element.

The invention will be discussed in terms of a bridge to measure a fixed R.-F. power of 1 milliwatt, but it will be understood that the discussion is also applicable to bridges designed to measure other fixed values of R.-F. power. It is also applicable to bridges which by obvious duplication of circuitry can measure several fixed values of R.-F. power.

The invention will be discussed in terms of a bridge using only D.-C. bias power, but it will be understood to apply to bridges using only A.-C. bias power at a single convenient frequency.

The amount of bias power required to balance the bridge depends, among other things, on the individual thermistor characteristics and the ambient temperature, and it is only the difference in bias power between the two balance adjustments which is significant. Because there is a real practical difficulty in accurately measuring small changes in large and widely varying amounts of bias power, this bias power is generally divided into two parts. One part is used for temperature and thermistor difference compensation, and is not changed between the two balance adjustments. The second part is generally smaller and independent of thermistor characteristics and temperature. Because of this independence, and its smaller magnitude, changes in this second part of the bias power can be accurately determined, and it is this part which is generally varied to compensate for the R.-F.

In order to maintain the independence of these two portions of the bias power, they are generally supplied at different frequencies, e.g., in the well-known Hewlett-Packard bridge, Model 430–c, the first part is D.-C. and the second part about 10 kc. A.-C. The necessity for this is clear from the following considerations. Suppose one bias supply provides current $I_1$ through the thermistor and the second provides current $I_2$. In general, the total thermistor bias power will be $(I_1+I_2)^2 \cdot R$, where R is the thermistor resistance. The exponent makes the product $(I_1 \times I_2)$ which is termed the "cross-product" one of the terms in the bias power. By using two different frequencies for $I_1$ and $I_2$, the average value of the product becomes essentially zero. If this were not done, the reduction in bias power for a given change in $I_2$ would depend on $I_1$, and the bridge design would be in very serious difficulties.

Although the use of two different frequencies eliminates the above described difficulty, it introduces another source of error. In bridges which supply both D.-C. and A.-C. power to a barretter, the barretter resistance will vary over the A.-C. cycle because of the variation of instantaneous power dissipation. This variation will cause a systematic error in the R.-F. power measurement depending upon the amounts of D.-C. and A.-C. power, and upon the ratio of the A.-C. period to the time constant of the barretter. In practice it is difficult to design such a bridge so that this systematic error can with certainty be held to less than 1%. If only D.-C. bias power or only A.-C. bias power is supplied to the barretter this error will not occur.

The bridge of the present invention uses D.-C. power for both supplies, and hence the cross product term previously mentioned is present and significant. However, its effect on the measurement is minimized by carefully designing all the impedances involved. It is apparent from theoretical calculations that this can be done with a considerable degree of success. To illustrate the basic idea, consider that there are two D.-C. supplies operating in parallel to bias the thermistor to operating resistance. One supply is adjustable and is always operative. The second is fixed in voltage and impedance and is connected only when the R.-F. is absent. That is, in a practical example, we want this second supply to increase the thermistor bias power by exactly 1 milliwatt when it is connected. Let us examine qualitatively the effect of the adjustable bias supply power upon power added by the fixed supply, assuming both are D.-C.

In the first example, let us assume that both supplies are high impedance so that the current through the thermistor from each supply is independent of the other. In that case, the change in bias power when the second (fixed) supply is connected, which we will call $\Delta P$, will be larger if the power contributed from the first (variable) supply is larger. To demonstrate this numerically, assume that the first (variable) supply contributes 10 milliamps and the second (fixed) supply 1 milliamp. Then the effect of connecting the second supply will be to change the total current from 10 to 11 milliamps., and to change the power from $10^{-4}$ R to $1.21 \times 10^{-4}$ R, a change or $\Delta P$ of $.21 \times 10^{-4}$ R watts. If the first supply current is increased to 11 milliamps., the connection of the second supply will change the current from 11 to 12 milliamps, and the power from $1.21 \times 10^{-4}$ R to $1.44 \times 10^{-4}$ R watts, $\Delta P$ is then $.23 \times 10^{-4}$ R watts. Thus in this high impedance case, the interaction of the two supplies is such that $\Delta P$ increases with increasing power from the first supply.

As a second example, consider that the first supply is high impedance, and the second supply has a very low output impedance. It is then clear that when the second supply is connected, it will fix the voltage across the thermistor circuits independently of the first supply, even though the first supply remains connected. Thus the total bias power when the second supply is connected is a fixed value independent of the first supply; and the change $\Delta P$ which occurs upon connection of this second supply is the difference between this fixed value and the bias power from the first supply alone. Clearly $\Delta P$ becomes smaller as the bias power from the first supply increase. We assume that the circuits are such that the bias power is larger when both supplies are connected.

Thus, if we consider the first supply to be high impedance, which was an assumption common to both examples, we find that for a high impedance second supply, $\Delta P$ increases with increasing bias power, and for a low impedance second supply, $\Delta P$ decreases with increasing bias power. We can reason therefore that there must be some intermediate value of second supply impedance at which $\Delta P$ will be independent of first supply bias power. This means that $\Delta P$, the bias power change which occurs on connection of the second supply, will be independent of the power from the first supply. If we can so calculate the circuits that this $\Delta P$ is exactly 1 milliwatt, we will have achieved our design objective. We expect, of course, that this independence will be only first order, and we must investigate the range of bias power adjustment over which it is valid. We must also investigate the sensitivity of $\Delta P$ to a number of bridge parameters which may drift, and design so as to minimize the most critical of these sensitivities. However, the general idea is, as stated, to adjust the bridge parameters so that the connection to the fixed second supply will change the bias power into the thermistors by 1 milliwatt independently (within limits) of the setting of the variable supply which is used to compensate for ambient temperature, etc. Having accomplished this, the bridge can then be operated as follows: with both supplies connected but no R.-F. we balance the bridge by adjusting the first supply. Then we disconnect the second supply and adjust the R.-F. to balance the bridge again. The R.-F. power will then be exactly 1 milliwatt.

It is a major object of the invention in a milliwatt bridge of the bolometric type described, to dispense with the need of using two different frequencies in the bridge circuit and to employ D.-C. or the same low frequency for both external power supplies.

Another object is to provide a microwave power bridge using a self-contained standard cell as a voltage reference.

A further object is to provide a simple, yet rugged and stable, microwave power bridge using D.-C. (or low frequency A.-C.) and so arranged that the D.-C. current paths shall not be influenced by the microwave circuit and vice versa.

The specific nature of the invention, as well as other objects and advantages thereof, will clearly appear from a description of a preferred embodiment as shown in the accompanying drawing, in which:

FIG. 1 is a schematic circuit diagram illustrating the principle of the invention and showing the preliminary balancing step;

FIG. 2 is a similar diagram showing the R.-F. balancing step;

FIG. 3 is a diagram similar to FIG. 2, using a feed-through type of coaxial connector;

FIG. 5 is a longitudinal sectional view of the thermistor mount with R.-F. and D.-C. connections; and FIG. 6 is a sectional view of the mounted thermistor disc unit.

Figure 4:
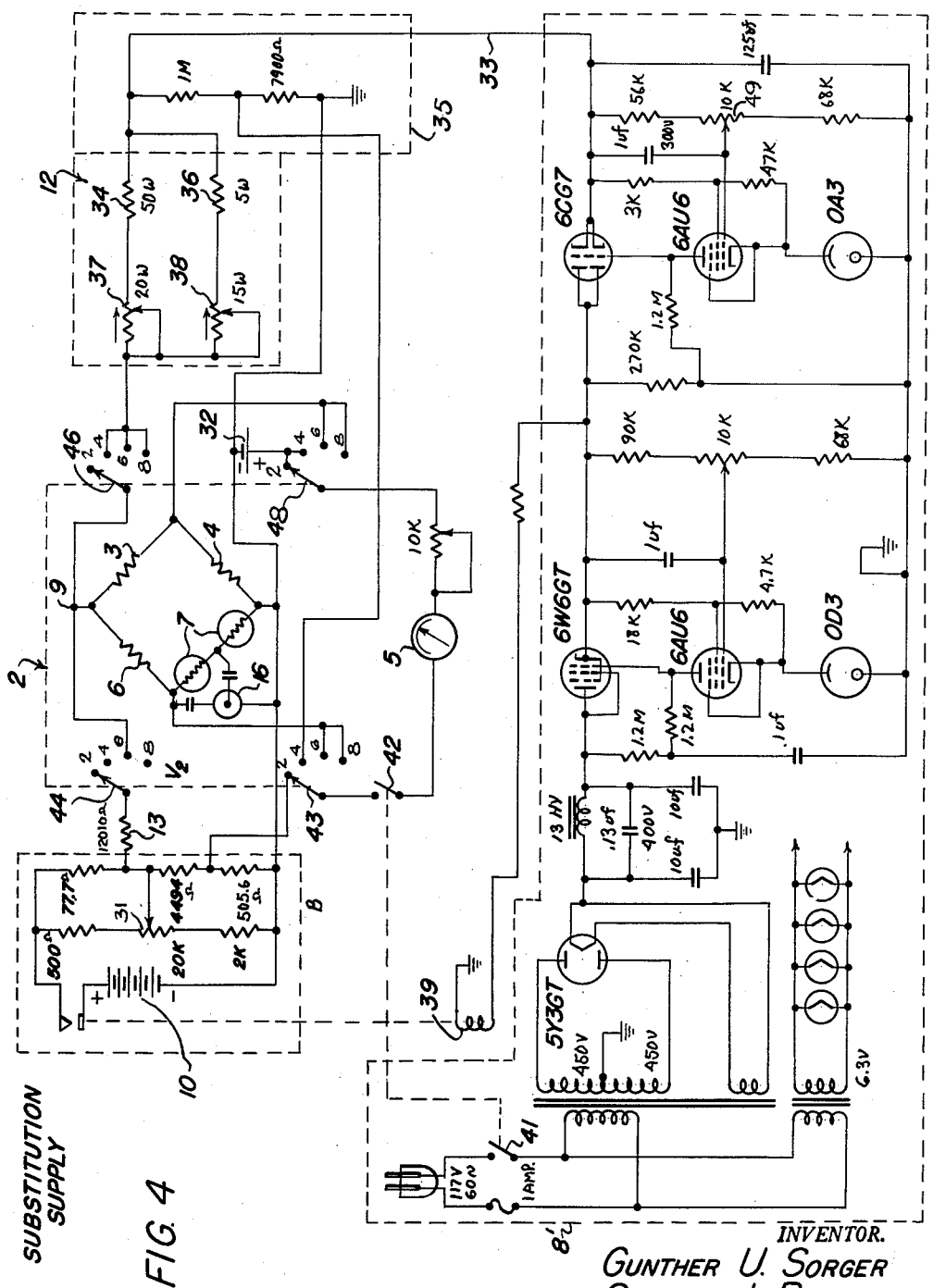
FIG. 4 is a schematic diagram of an actual circuit employed in practice.

FIG. 1 is a schematic diagram of the basic bridge circuit of the invention. The Wheatstone bridge 2 is shown with three standard resistors 3, 4 and 6 forming three arms of the bridge and the fourth arm 7 consists of the thermistor arm, as described above. In a practical embodiment, it has been found convenient, because of the sizes of thermistors commercially available, to use two 100 ohm thermistors in series for arm 7 of the bridge.

As will be seen later, when the high-frequency measure is being made, the R.-F. energy is fed to these two thermistors in parallel, giving an R.-F. impedance of 50 ohms looking into the R.-F. circuit, which is desirable for R.-F. impedance matching to minimize reflections.

The bridge is fed by two separate D.-C. supplies. The first, or temperature-compensating supply 8 is connected to terminals 9 and 11 of the bridge through a variable resistance 12. The second supply 10 is arranged to provide a fixed constant amount of power to the bridge, e.g., 4 milliwatts, 1 milliwat of which is dissipated in the two barretters. In this case, after the bride is balanced, the second supply will be cut out and the R.-F. power supplied to the barretters in its place. This R.-F. power will then be adjusted until the bridge is again balanced, and it will then be known that the R.-F. circuit so adjusted, supplies 1 milliwatt to the barretters, to an accuracy, in practice, of at least 99%. The R.-F. circuit can then be used as a secondary standard.

It will be understood that substituting any arbitrary values of voltages $V_1$ and $V_2$, and of resistors 12 ($R_1$) and 13 ($R_2$) will not, in general, produce an accurate R.-F. power measurement for the reasons discussed above. It is necessary, in order to make the cross product term of the two separate power supplies ($V_1$ and $V_2$) independent of $V_1$ that the circuit be designed in accordance with the considerations given in the above explanatory discussion. An example of suitable values is shown in FIG. 1, where $V_1 = 130$ v.; $V_2 = 10$ v.; $R_1 = 5,107.2$ ohms; $R_2 = 12,112.8$ ohms; and the bridge arms are each 200 ohms resistance.

Such a bridge has been made to give the following performance characteristics:

(1) Error less than 0.2% for temperature range between 18° C. and 28° C.; less than 1% for temperature between 12° C. and 34° C.

The thermistors used were Western Electric (or Victory Co.) No. 23–A thermistor bead, with cold resistance of 2,000 ohms.

FIG. 2 shows schematically the circuit arrangement for supplying the previously balanced bridge with R.-F. which is fed in through a standard R.-F. terminal 16 from a coaxial line to the midpoint 17 of the two thermistors, through a low-impedance capacitor 18. For the R.-F. path, point 19 is connected to grounded point 11 of the bridge through low-impedance condenser 20 and the grounded outer shell of terminal 16, so that the two thermistor elements are fed in parallel from the R.-F. source. The source $V_2$ is disconnected, e.g., switch 21 of FIG. 1 is in the open position while the R.-F. adjustment is being made. In general, the change from the connection of FIG. 1 to that of FIG. 2 will cause unbalance of the bridge. The R.-F. source 16a is now adjusted until the bridge is rebalanced, and the R.-F. power input is now, for the circuit values given, 1 milliwatt, since removal of $V_2$ also meant removal of 1 milliwatt of power.

FIG. 4 is a schematic diagram of a practical circuit embodying the principle described above. The bridge 2 has its arms 3, 4, 6 and 7 numbered as in FIGS. 1 and 2, although drawn in mirror image for convenience. The temperature compensating supply 8 is shown in the dotted line area, which contains the circuitry of a highly stable voltage supply which we term a "super-regulated bias supply," and which, over the ten minutes or so during which the test may last, will supply a voltage stable to an accuracy of better than 0.2%, and supply constant power with less than 1 microwatt variation during that interval. This corresponds to an instability of less than 1 part in $10^{-5}$; the circuit shown is effective to maintain a dissipation of 30 milliwatts in the two thermistors constant to within one microwatt.

Power supplies of the necessary accuracy and stability are commercially available, but are very expensive. The circuit shown will also provide the necessary stability by cascading two regulated supplies and depends on the stability of two VR tube circuits, the VR tubes being maintained in a light-tight enclosure so that their stability does not change. The circuit actually used in a practical embodiment is shown, but since it is not part of the present invention, its operation will not be described in detail.

The voltage 10 ($V_2$) for the 1 milliwatt supply is provided by a series of eight mercury cells 10, supplying a relatively high-impedance potentiometer 31, which permits good impedance stability to be maintained. The initial voltage calibration is obtained from any conventional standard cell 32, which in this case supplies 1.019 volts.

The voltage from the super-regulated bias supply 8' is fed on line 33 through a bias supply voltage adjusting potentiometer 34 to the bias adjusting resistance circuit 12 (see FIG. 1) which in practice is composed of parallelled resistors 34 and 36 each in series with an adjustable resistor 37 and 38 respectively as shown, to enable a very fine resolution over the necessary range to be obtained. These resistors are of high power as shown, so that the power dissipation in them will have no effect on the stability of this bias-adjusting circuit 12.

The actual 1 milliwatt supply is provided by the series of mercury cells at 10, which are put into the circuit by relay 39 when the super-regulated voltage supply 8 is turned on by means of main off-on switch 41 ganged to switch 42, which also closes the bridge circuit to the galvanometer 5. A Leeds and Northrup No. 2310B galvanometer is suited for this purpose.

By means of potentiometer 31 the mercury cell output is adjusted to give a voltage required to comply with the principle of the invention as indicated above, e.g., 10 volts. The resistance 12 is similarly adjusted to give the desired resistance as indicated in the example.

In using the apparatus, the selector switches 43, 44, 46 and 48, which are ganged together, are set to position No. 2. In this position the galvanometer 5 is placed between the standard cell 32 and substitution bias supply potentiometer 31, which is fed by the mercury cells. Then the potentiometer 31 of the substitution supply 10 is adjusted until the galvanometer 5 shows no deflection; at this point, the voltage of the second supply is now adjusted to the predetermined value required, e.g., 10 volts. Gang switch 43, 44, 46 and 48, is now set at position No. 4; in this position the galvanometer 5 is now between the voltage divider 35 fed by the super-regulated supply 8 and the standard cell, and the output potentiometer 49 of the supply 8 is adjusted until the galvanometer 5 shows no deflection; the voltage of the supply is now 130 volts (to 0.05%).

The gang switch is now moved to position No. 6; in this position the galvanometer is directly across the bridge unbalanced points and the bias adjust 12 is now adjusted to balance (with no R.-F. input) at which point the barretter resistance is exactly 200 ohms.

The gang switch is now set to position No. 8; in this position the substitution supply is turned off, and the bridge goes into unbalance because 1 milliwatt of D.-C. has been removed. Radio-frequency power is now introduced through R.-F. terminal 16, from a variable R.-F. supply, which is adjusted until the bridge is in balance. This means that 1 milliwatt R.-F. power has been added which is the desired goal.

The microwave power is fed in by means of a standard coaxial connector 61 (FIG. 5) having an outer conductor 62 terminating in a flange 64 and an inner concentric conductor 63. The flange 64 is bolted or otherwise secured to a metal block 66 so as to retain between them a mica disc assembly 67 and 68 bearing thermistor elements 7a and 7b respectively. The mica disc elements are coated on both sides with conducting material, e.g., paint, which serves both to make the necessary connections and also provides the necessary shunt capacitance 20 shown in FIG. 2, since the physical structure shown provides an R.-F. capacitance of the necessary magnitude. The thermistors 7a and 7b are conductively connected to center pin 69 which fits in insulated fashion into the end of center conductor 63 so as to provide the necessary capacitance 18 (FIG. 2). The non-common lead 71 of thermistor 7b is connected to the outer grounded conductor 62 of the coaxial line, while the non-common lead 72 of thermistor 7a is connected to the D.-C. output terminal 73 which is mounted in insulating relation on block 66. Thus the mount shown can be readily connected to a standard coaxial fitting at 61, and to a D.-C. circuit at 73. The outer conductor 62 and block 66 are grounded in conventional fashion.

The mount shown in FIG. 5 is an R.-F. termination mount, i.e., when suitably adjusted as described, it dissipates 1 milliwatt of R.-F. energy and may be used as a power measurement standard. In some cases it may be desired to use the principle of the invention for R.-F. voltage measurements; for this purpose a through-mount is provided as shown schematically in FIG. 3 in connection with the same bridge circuit as before. In this case the end plate 66 is omitted and the coaxial line 62, 63 is merely carried out to another coaxial terminal fitting 76 connected to conductors 62', 63', corresponding to conductors 62, 63 in FIG. 5, and suitable condensers 77, 78 are provided in any known fashion to put the thermistors in parallel with respect to the R.-F. circuit so that they will present the proper matching impedance. It will be apparent that the physical construction to provide this circuit arrangement, while generally similar to that shown in FIG. 5, can take many forms within the skill of the R.-F. circuit designer. In the circuit of FIG. 3, since the power dissipated in the thermistor circuit can be very accurately determined, the voltage drop in this portion of the circuit can obviously be correspondingly established with a high degree of accuracy, and the invention can therefore also be used as a voltage standard.

FIG. 6 shows the construction of the thermistor disc in cross-section. The disc, in the typical case, is a little over two inches in diameter, and in the case of 0.003 inch thick. Windows 81 and 82 are cut through the disc and the thermistor beads 7a and 7b placed within the windows, in which they are mounted by the thin wires, such as 84 and 86, extending from the thermistor bead. These wires lead to conductive coating such as 87 and 88 on the face of the disc, which are preferably applied by printed circuit techniques. The opposite side of the disc is also suitably coated with conducting material as indicated at 89, whereby the necessary capacitance is obtained. The mica disc arrangement shown is only one convenient way of mounting the thermistor beads, and it will be apparent that the beads may be mounted in any other suitable fashion.

It will be apparent that the embodiments shown are only exemplary and that various modifications can be made in construction and arrangement within the scope of the invention as defined in the appended claims.

What is claimed is:

1. Apparatus for measuring R.-F. power comprising a bridge circuit one arm of which comprises a bolometric resistor having a substantial temperature coefficient of resistivity, means for supplying D.-C. bias power to said bridge respectively from two separately adjustable supply circuits, each of said supply circuits having its own independent voltage supply, the first of said circuits being an adjustable supply circuit for compensating for temperature difference and resistor differences, and the second being a supply circuit which adds a predetermined power input value at the bridge balance condition, the respective values of the two said voltage supplies and the ratio of the impedances of said two circuits being such that the cross product current term of the bolometric resistor power due to the sum of both sources is substantially independent of the setting of the adjustable supply, means for adjusting the impedance of said first supply to balance the bridge, and means for substituting a source of R.-F. power for said second supply to determine whether the R.-F. power input is the same as that previously added by said second supply.

2. The invention according to claim 1, said source of R.-F. power being a variable source, and means for varying the power output of said last source to rebalance the bridge.

3. Apparatus for measuring R.-F. power comprising three fixed resistors comprising three arms of a bridge circuit and bolometric resistance means comprising the fourth arm of the bridge, electric measuring means connected across one diagonal of said bridge, and power supply means connected across the other diagonal of the bridge, said power supply means comprising two separate and independent D.-C. supply circuits each with its own independent voltage source, the first being a temperature difference compensating supply circuit and the second being a power substitution circuit, each of said circuits separately supplying current to said bridge, the respective voltages and impedances of said two circuits being such that the cross product current term of the bolometric resistance power due to the sum of both sources is substantially independent of the first supply setting, means for adjusting the impedance of said first to balance the bridge, and means for substituting a source of adjustable R.-F. frequency power for said second source to rebalance the bridge at an R.-F. power input equal to the power input of said second supply circuit.

4. The invention according to claim 3, said first means for supplying D.-C. bias power comprising a highly-regulated bias supply having a voltage stability of better than 99.8%, and an adjustable bias supply voltage adjusting potentiometer fed by said bias supply; said second means for supplying D.-C. bias power comprising a series of stable secondary cells, a high-impedance potentiometer connected across said cells, a standard cell, first switch means for selectively connecting said standard cell and said secondary cells to said potentiometer, and for connecting the output of said potentiometer to said measuring means to initially calibrate said second means; second switch means for selectively connecting second standard cell and said first means to said measuring means to initially calibrate said first means; third switch means for selectively connecting both supplies to said bridge; and means for adjusting the voltage output of said first means to balance the bridge.

References Cited in the file of this patent
UNITED STATES PATENTS

| | | |
|---|---|---|
| 2,399,481 | George | Apr. 30, 1946 |
| 2,855,570 | Gallagher | Oct. 7, 1958 |
| 2,883,620 | Selby | Apr. 21, 1959 |
| 2,887,655 | Jaffee | May 19, 1959 |
| 2,906,957 | Easter | Sept. 29, 1959 |